(12) United States Patent
Holt et al.

(10) Patent No.: US 9,126,850 B1
(45) Date of Patent: Sep. 8, 2015

(54) LIQUID AERATION DEVICE

(71) Applicant: INTELLECTUAL PROPERTY DEPARTMENT, Madison, WI (US)

(72) Inventors: Karl K. Holt, Hartland, WI (US); Frank J Scott, Milwaukee, WI (US); James R. Schulz, Sullivan, WI (US); Daniel H. Dickman, Trevor, WI (US)

(73) Assignee: Aero-Stream LLC, Hartland, WI (US)

( * ) Notice: Subject to any disclaimer, the term of this patent is extended or adjusted under 35 U.S.C. 154(b) by 69 days.

(21) Appl. No.: 13/662,787

(22) Filed: Oct. 29, 2012

Related U.S. Application Data

(60) Provisional application No. 61/628,395, filed on Oct. 31, 2011.

(51) Int. Cl.
*B01F 3/00* (2006.01)
*C02F 3/12* (2006.01)
*B01F 3/04* (2006.01)
*C02F 3/20* (2006.01)

(52) U.S. Cl.
CPC .............. *C02F 3/12* (2013.01); *B01F 3/04099* (2013.01); *C02F 3/1284* (2013.01); *C02F 3/20* (2013.01)

(58) Field of Classification Search
CPC .............. C02F 3/30; C02F 3/20; C02F 3/12; C02F 3/1284; B01F 3/0412; B01F 3/04099; B01F 3/0412
USPC ....................................................... 261/120
See application file for complete search history.

(56) References Cited

U.S. PATENT DOCUMENTS

| | | | | |
|---|---|---|---|---|
| 2,590,581 A | * | 3/1952 | Shirley | 261/93 |
| 2,827,268 A | * | 3/1958 | Staaf | 366/264 |
| 3,148,509 A | * | 9/1964 | Laurie | 405/22 |
| 3,189,334 A | * | 6/1965 | Bell | 261/93 |
| 3,193,260 A | * | 7/1965 | Lamb | 261/64.1 |
| 3,540,222 A | * | 11/1970 | Mendelson | 405/52 |
| 3,758,083 A | * | 9/1973 | Palmer | 261/25 |
| 3,856,272 A | * | 12/1974 | Ravitts | 366/343 |
| 4,051,810 A | * | 10/1977 | Breit | 119/51.04 |
| 4,117,044 A | * | 9/1978 | Durda et al. | 261/30 |
| 4,234,269 A | * | 11/1980 | Person et al. | 405/224.2 |
| 4,298,295 A | * | 11/1981 | Bozzo et al. | 405/52 |
| 4,326,840 A | * | 4/1982 | Hicks et al. | 417/331 |

(Continued)

OTHER PUBLICATIONS

Foam-Tech "What is the difference between open-cell and closed-cell urethane foam" published Sep. 22, 2010 available at <https://web.archive.org/web/20100922121310/http://foam-tech.com/products/urethane_foam/open_closed_cell.htm> (hereafter Foam-Tech).*

*Primary Examiner* — Duane Smith
*Assistant Examiner* — Stephen Hobson
(74) *Attorney, Agent, or Firm* — Joseph T. Miotke; DeWitt Ross & Stevens, SC

(57) ABSTRACT

A self-uprighting aeration device that minimizes turbulence and disruption of any sediment layer in a tank. The device includes a float positioned about a first position on a longitudinal axis of the aeration device, a ballast positioned about a second position on the longitudinal axis, and a diffuser. The float and the ballast are configured to orient the aeration device in a liquid with the longitudinal axis substantially aligned with a gravitational vector to dispose the diffuser above the sediment layer. The aeration device can be configured to rest on a support surface in the tank or float above such a support surface. Methods for aerating liquid in tanks with the aeration device are also provided.

20 Claims, 4 Drawing Sheets

(56) References Cited

U.S. PATENT DOCUMENTS

| | | | |
|---|---|---|---|
| 4,439,060 A * | 3/1984 | Liscio | 405/61 |
| 4,488,508 A * | 12/1984 | Heideman | 119/215 |
| 4,505,617 A * | 3/1985 | Miller et al. | 405/211 |
| 4,749,493 A * | 6/1988 | Hicks | 210/617 |
| 4,752,421 A * | 6/1988 | Makino | 261/77 |
| 4,966,690 A * | 10/1990 | Gardiner et al. | 210/86 |
| 5,336,399 A * | 8/1994 | Kajisono | 210/170.02 |
| 7,132,050 B2 * | 11/2006 | Davis et al. | 210/615 |
| 7,264,727 B2 | 9/2007 | Holt | |
| 7,329,351 B2 * | 2/2008 | Roberts et al. | 210/620 |
| 7,429,320 B2 | 9/2008 | Holt | |
| 7,468,135 B2 | 12/2008 | Holt | |
| 7,575,226 B2 * | 8/2009 | Reusche et al. | 261/36.1 |
| 7,708,259 B2 | 5/2010 | James | |
| 7,718,067 B2 | 5/2010 | Holt | |
| 8,651,766 B2 * | 2/2014 | Kortmann | 405/52 |

* cited by examiner

LIQUID AERATION DEVICE

CROSS-REFERENCE TO RELATED APPLICATIONS

This application claims priority under 35 USC §119(e) to U.S. Provisional Patent Application 61/628,395 filed Oct. 31, 2011, the entirety of which is incorporated herein by reference.

FIELD OF THE INVENTION

This invention relates generally to aeration systems that aerate liquid and components thereof. More particularly, it relates to an improved method and apparatus to increase the levels of dissolved oxygen and aerobic bacteria activity in septic tanks without disturbing the solid settling process and the sediment layer at the bottom of the tank.

BACKGROUND

Septic systems are common systems for treating wastewater. Most septic systems comprise an inlet pipe, a septic tank, an outlet pipe, and an absorption component. The septic tank is designed to hold wastewater for a period of time to allow bacteria to break down organic material in the wastewater and to permit heavier solids to settle at the bottom of the tank. These actions reduce the amount of organic material leaving the septic tank compared to what enters. The wastewater leaving the septic tank via the outlet pipe enters the absorption component, where the water passes back to the ground. Any remaining organic material in the wastewater collects in the absorption component.

Over time, the settled solids at the bottom of the septic tank accumulate to the point that they have to be pumped out. At the same time, the level of organic material collecting in the absorption component also accumulates, but there is no efficient way to remove these solids. Eventually, the organic material accumulation in the absorption component becomes so great that the absorption component can no longer pass water from the septic tank to the ground, and the system is considered to be in failure.

Wastewater aeration systems are typically used to remediate a failed septic system or to improve the operating efficiency of a functioning septic system. See U.S. Pat. Nos. 7,264,727; 7,429,320; 7,468,135; 7,708,259; and 7,718,067. The purpose of these systems is to introduce and increase levels of dissolved oxygen in the wastewater and change the dominant life-respiration processes from anaerobic to aerobic. Aerobic bacteria are dramatically more efficient and faster at breaking down organic material in wastewater into simpler solids and gases than anaerobic bacteria. As a result, consumption of organic waste by aerobic bacteria is increased and turbidity and suspended solid levels drop dramatically. These processes can also extend into and benefit the absorption component of the septic system, wherein residual organic matter is broken down and water is passed back to the ground at increased efficiency.

Septic system aeration is most often performed in the septic tank because this is where the bulk of the organic waste breakdown occurs. Almost all septic tank aeration systems introduce air into the wastewater by a positive displacement air pump. The air pump is connected to one or more lengths of flexible or rigid tubing that are placed in the wastewater and are connected to diffusing devices that break up the air into small bubbles, greatly improving the transfer of oxygen from the air to the wastewater.

While the aeration process described above dramatically improves wastewater processing compared to an anaerobic environment, one significant problem is that the flow of air bubbles to the surface of the water creates turbulence in the septic tank. The turbulence has two negative consequences: It disrupts the solid settling process and disturbs solids that have settled. As a result, even though turbidity and suspended solid levels drop dramatically in the wastewater leaving the septic tank, they are not as low as they could be because of the turbulence introduced by the aeration process. If turbulence were to be reduced in the aeration process, even cleaner wastewater would leave the septic tank, further reducing the amount of solids entering the absorption component and improving the operational efficiency of the entire system. There is a need for an aeration system that efficiently aerates liquid and minimizes turbulence.

SUMMARY OF THE INVENTION

The present invention provides an aeration device for aerating liquid while minimizing the amount of turbulence introduced therein. The present invention provides an aeration device that can be used for aerating water in a septic tank or other type of tank while limiting the amount of turbulence introduced at the bottom of the tank. The aeration device provides a self-orientation feature. The aeration device can be supported by the tank floor on a single, non-balancing surface of the aeration device or can be converted or designed to float in the tank and be suspended above the tank floor. A version of the apparatus, in a simple form, comprises a float disposed at an upper portion of the aeration device, a ballast disposed at a lower portion of the aeration device, a diffuser, and an air line that delivers airflow to the diffuser. The air delivered to the diffuser from the air line is discharged in the form of micro-bubbles from the diffuser. The float provides buoyancy and allows the aeration device to be positioned at any of various positions between the bottom of the septic tank and the water surface depending on the balance between mass of the ballast and the buoyancy of the float. The float and the ballast also ensure that the aeration device remains in the water in a substantially upright, or vertical, position because the buoyancy force is constrained in a vertical axis. This obviates the need for a balancing support on the lower end of the device.

The aeration device is configured to dispose the diffuser above the sediment layer on the septic tank floor. In the configuration in which the aeration device is supported in an upright position on the septic tank floor, the diffuser is held above the tank floor by the length of a bottom portion of the aeration device. This length may span at least the depth of the sediment layer on the septic tank floor. In the configuration in which the aeration device floats in an upright position above the septic tank floor, the diffuser is suspended above the sediment layer.

With the diffuser disposed above the sediment layer, the flow paths of the air bubbles minimize wastewater turbulence in the septic tank. The solids settling process and the sediment layer at the bottom of the septic tank remain undisturbed. The premature discharge of suspended solids from the septic tank is greatly reduced.

Some versions of the invention additionally comprise a diffuser control tube disposed about the diffuser. The diffuser control tube confines the flow path of the air bubbles within its inner volume, which further reduces wastewater turbulence in the septic tank.

The aeration device described herein can be used to aerate any liquid in any system. For example, the aeration device can be used to aerate ponds, process water, etc. The aeration device can also be supported on any support surface within a given tank or system.

The objects and advantages of the invention will appear more fully from the following detailed description of the preferred embodiment of the invention made in conjunction with the accompanying drawings.

DETAILED DESCRIPTION OF THE INVENTION

Figure 1A:
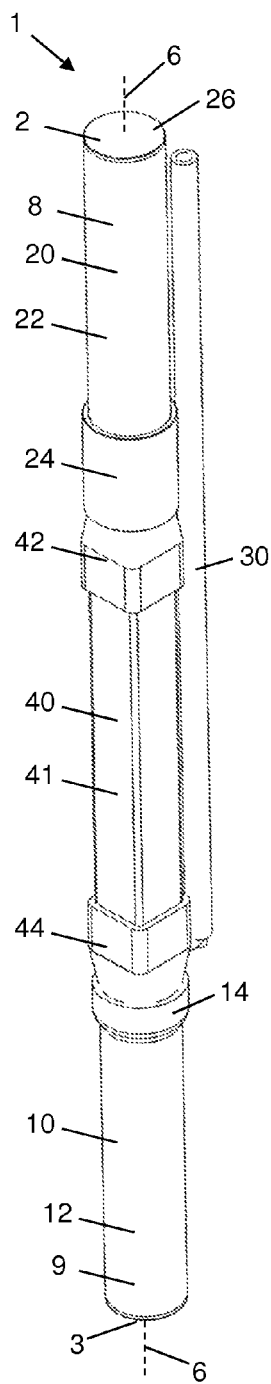
FIG. 1A depicts a perspective view of an exemplary aeration device of the present invention.

The aeration device 1 of the present invention may include a diffuser 40, a float 20, and a ballast 10.

The diffuser 40 accepts air from an air source and diffuses it in surrounding liquid in the form of micro-bubbles. The diffuser 40 generates the micro-bubbles by passing air through perforations in an interface between the air source and the liquid. The diffuser 40 can be constructed from any of a variety of materials, including but not limited to plastics and metals, and can embody any of a variety of shapes. In some versions of the invention, the diffuser 40 may comprise or consist of sintered silica. The diffuser 40 can be extended along a longitudinal axis or can embody a compact, substantially symmetrical or asymmetrical shape. The cross-sectional geometry of the diffuser 40 can be round, square, or any other geometric shape. If extended along an axis, the diffuser 40 can be oriented with its extended axis aligned with a longitudinal axis 6 of the aeration device 1 (as shown in FIGS. 1A-C, 3, and 4), perpendicular to the longitudinal axis 6 of the aeration device 1, or at any angle with respect thereto.

The diffuser 40 may be connected in an air-tight manner with an air source. The air source may be a positive displacement air pump. The diffuser 40 may be linked with the air source by an air line 30. The air line 30 may be comprised of flexible or rigid tubing, and, in certain versions, is comprised of flexible plastic. The air line 30 in some versions is distinct from the diffuser 40 and float 20. The air line 30 may feed air directly to the diffuser 40 by connecting directly thereto (see FIGS. 1A-C and 4), feed air indirectly to the diffuser 40 by connecting to a float 20 in fluidic connection with the diffuser 40, or feed air directly and simultaneously to the diffuser 40 and a float 20, such as when the diffuser 40 and float 20 overlap (see FIG. 3) or when the air line 30 splits prior to connecting to a diffuser 40 and distinct float 20. The air line 30 may be connected to the diffuser 40, float 20, or other elements by various adapter connectors (32,34 in FIGS. 1A-C and 3), which may be barbed to ensure a tight connection.

The float 20 provides buoyancy for the aeration device 1. The float 20 occupies a volume and defines an average density over this volume. In some versions of the invention, the average density of the float 20 is less than average density of the aeration device 1 as a whole. In order to provide buoyancy in a given liquid, the float 20 defines an average density less than the density of the liquid. In various versions of the invention, the float 20 may define an average density of less than about 0.001 g/cm$^3$, less than about 0.01 g/cm$^3$, less than about 0.1 g/cm$^3$, less than about 0.2 g/cm$^3$, less than about 0.3 g/cm$^3$, less than about 0.4 g/cm$^3$, less than about 0.5 g/cm$^3$, less than about 0.6 g/cm$^3$, less than about 0.7 g/cm$^3$, less than about 0.8 g/cm$^3$, less than about 0.9 g/cm$^3$, less than about 1.0 g/cm$^3$, less than about 1.1 g/cm$^3$, less than about 1.2 g/cm$^3$, less than about 1.3 g/cm$^3$, less than about 1.4 g/cm$^3$, less than about 1.5 g/cm$^3$, between about 0.001 g/cm$^3$ and about 1.5 g/cm$^3$, between about 0.001 g/cm$^3$ and about 1.3 g/cm$^3$, between about 0.001 g/cm$^3$ and about 1.0 g/cm$^3$, between about 0.01 g/cm$^3$ and about 1.0 g/cm$^3$, or between about 0.1 g/cm$^3$ and about 1.0 g/cm$^3$. In certain versions of the invention, the float 20 may be configured to provide buoyancy in septic water and has an average density less than the density of septic water. The buoyancy of the float 20 can be increased by decreasing its average density or by increasing the volume that the float 20 occupies (i.e., using a larger float 20). Conversely, the buoyancy of the float can be decreased by increasing its average density or by decreasing the volume that the float occupies (i.e., using a smaller float 20).

Figure 1B:
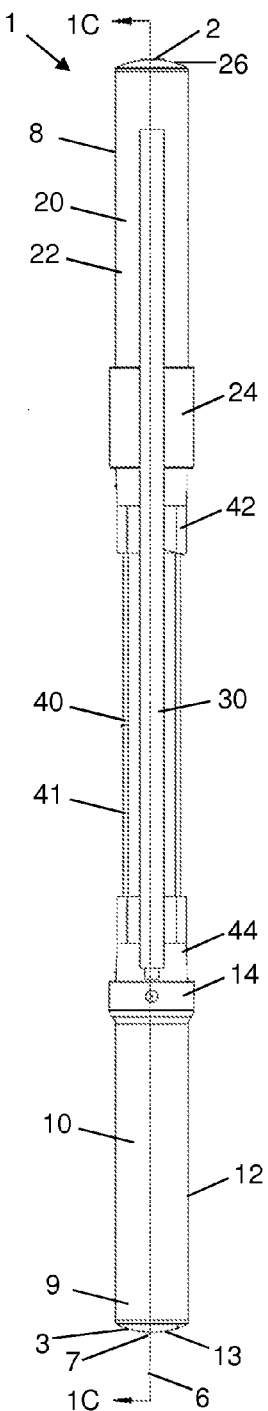
FIG. 1B depicts a plan view of the aeration device shown in FIG. 1A.
Figure 1C:
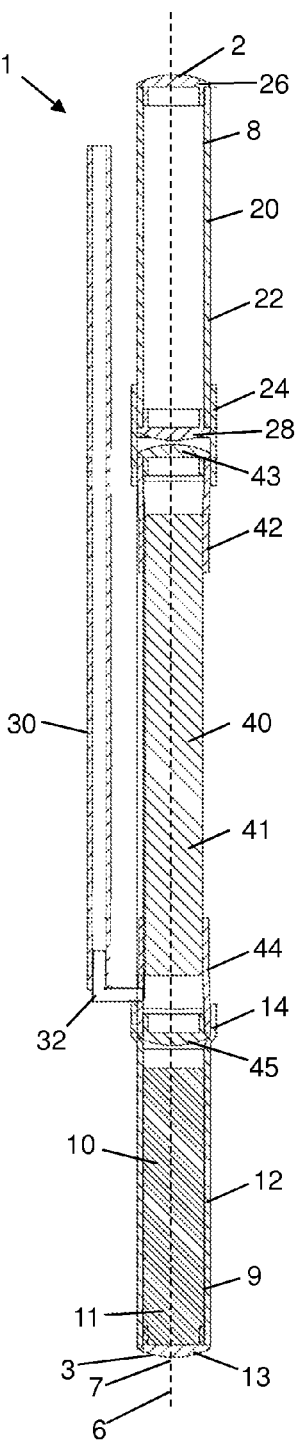
FIG. 1C depicts a cutaway view of the aeration device shown in FIG. 1B as viewed along line 1C.
Figure 3:
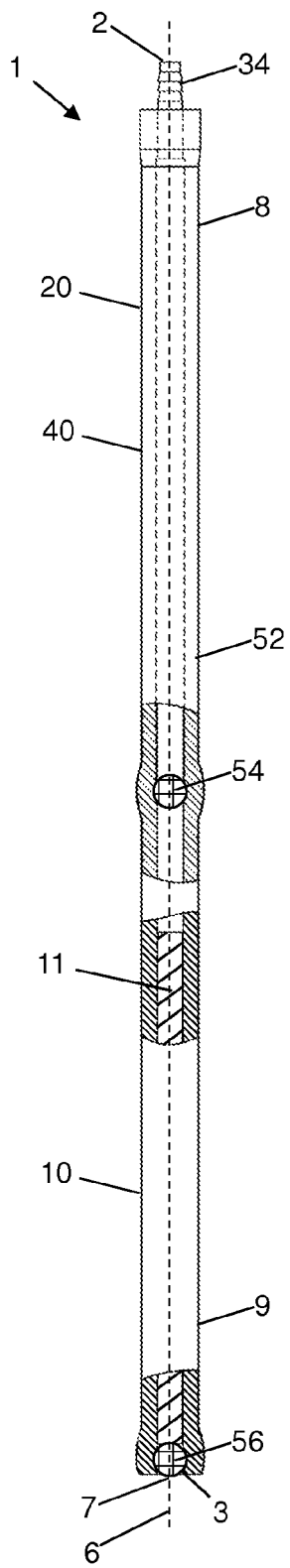
FIG. 3 depicts a partial-cutaway, elevation view of another exemplary aeration device of the present invention.

The float 20 may comprise any material or combination of materials providing a suitable average density for providing buoyancy in a given liquid. Some versions of the float 20 include unitary pieces of foam or other low-density materials. Other versions of the float 20 include a vacuumed, or air-contained, fluid-tight container, as shown in FIGS. 1A-C. The container can either be permanently sealed or can be reversibly sealed, the latter being shown with the float tube 22 capped with end caps 26,28 in FIGS. 1A-C. A substantially fluid-tight seal maintains a suitable average density by preventing any air contained within the container from leaking into surrounding liquid and by preventing the surrounding liquid from leaking into the container. Yet other versions of the float 20 include a fluid-porous container with air fluxed therethrough, as shown in FIG. 3. The air fluxing through such a float 20 enables the float 20 to maintain a suitable density by preventing the surrounding liquid from leaking into the container. In such versions, the float 20 and the diffuser 40 overlap and may be entirely coextensive. The air fluxing through the fluid-porous container provides suitable buoyancy to create a float 20, and the release of the air through the pores into the surrounding liquid provides suitable air diffusion in the form of micro-bubbles to create a diffuser 40.

The float 20 can embody any of a variety of shapes. The float 20 can be extended along a longitudinal axis or can embody a compact, substantially symmetrical or asymmetrical shape. The cross-sectional geometry of the float 20 can be round, square, or any other geometric shape. If extended along an axis, the float 20 can be oriented with its extended axis aligned with a longitudinal axis 6 of the aeration device 1 (as shown in FIGS. 1A-C, 3, and 4), perpendicular to the longitudinal axis 6 of the aeration device 1, or at any angle with respect thereto. The float 20 can be laterally flexible or rigid. The float 20 may also be longitudinally rigid, extendable, collapsible, or telescoping.

Air tubes typically used in conventional septic tank aeration systems have a narrow diameter, are comprised of dense rubber or plastic tubing, and therefore do not provide a suitable buoyancy for either maintaining an aeration device in an upright position or for enabling floatation of the aeration device. The tubing used in the various floats 20 of the present invention has a larger inner diameter and reduced thickness (distance between inner and outer diameter) and, in some aspects, is comprised of a material with less density than the tubing typically used as air tubes in conventional septic tank aeration systems. In various aspects of the invention, the tubing used in the various floats 20 of the present invention may be composed from a material having a density less than the density of septic water, less than about 0.05 g/cm$^3$, less than about 0.1 g/cm$^3$, less than about 0.2 g/cm$^3$, less than about 0.3 g/cm$^3$, less than about 0.4 g/cm$^3$, less than about 0.5 g/cm$^3$, less than about 0.6 g/cm$^3$, less than about 0.7 g/cm$^3$, less than about 0.8 g/cm$^3$, less than about 0.9 g/cm$^3$, less than about 1.0 g/cm$^3$, less than about 1.1 g/cm$^3$, less than about 1.2 g/cm$^3$, less than about 1.3 g/cm$^3$, less than about 1.4 g/cm$^3$, less than about 1.5 g/cm$^3$, between about 0.05 g/cm$^3$ and about 1.5 g/cm$^3$, between about 0.05 g/cm$^3$ and about 1.3 g/cm$^3$, between about 0.05 g/cm$^3$ and about 1.0 g/cm$^3$, or between about 0.1 g/cm$^3$ and about 1.0 g/cm$^3$.

The ballast 10 provides a gravitational counterforce to the buoyancy of the float 20. The ballast 10 occupies a volume and defines an average density over this volume. The average density of the ballast 10 in some versions is greater than average density of the aeration device 1 as a whole. The average density of the ballast 10 may also or alternatively be greater than the average density of the float 20. The average density of the ballast 10 may also or alternatively be greater than the density of the liquid, such as septic wastewater, in which the aeration device 1 is intended to be used. The average density of the ballast 10 in some versions is at least about 1.02-fold, at least about 1.25-fold, at least about 1.5-fold, at least about 2-fold, at least about 4-fold, at least about 5-fold, at least about 10-fold, at least about 20-fold, at least about 50-fold, at least about 100-fold or more the average density of the float 20. In various versions of the invention, the ballast 10 may define an average density of greater than about 1 g/cm$^3$, greater than about 2 g/cm$^3$, greater than about 3 g/cm$^3$, greater than about 4 g/cm$^3$, greater than about 5 g/cm$^3$, greater than about 6 g/cm$^3$, greater than about 7 g/cm$^3$, greater than about 8 g/cm$^3$, greater than about 9 g/cm$^3$, greater than about 10 g/cm$^3$, between about 1 g/cm$^3$ and about 10 g/cm$^3$, between about 3 g/cm$^3$ and about 10 g/cm$^3$, or between about 5 g/cm$^3$ and about 10 g/cm$^3$. The gravitational force on the ballast 10 can be increased by increasing its average density or by increasing the volume that the ballast 10 occupies (i.e., using a larger ballast 10), thereby providing more mass. Conversely, the gravitational force on the ballast 10 can be decreased by decreasing its average density or by decreasing the volume that the ballast 10 occupies (i.e., using a smaller ballast 10), thereby providing less mass.

The ballast 10 may comprise any material or combination of materials providing a suitable average density for countering the buoyancy of the float 20. Suitable materials include but are not limited to concrete, metal, sand, etc. The ballast 10 can embody any of a variety of shapes. The ballast 10 can be extended along a longitudinal axis or can embody a compact, substantially symmetrical or asymmetrical shape. The cross-sectional geometry of the ballast 10 can be round, square, or any other geometric shape. If extended along an axis, the ballast 10 can be oriented with its extended axis aligned with a longitudinal axis 6 of the aeration device 1 (as shown in FIGS. 1A-C, 3, and 4), perpendicular to the longitudinal axis 6 of the aeration device, or at any angle with respect thereto. The ballast 10 can be laterally flexible or rigid. The ballast 10 may also be longitudinally rigid, extendable, collapsible, or telescoping.

In some versions, the ballast 10 comprises a weight connected to an outer perimeter of the aeration device 1. In other versions, the ballast 10 comprises a weight connected to the aeration device 1 in the manner shown in FIG. 4. In yet other versions, the ballast 10 comprises a container containing a ballast insert 11, as shown, for example, in FIGS. 1A-C, 3 and 4. The container can contain the ballast insert 11 therein either by being permanently closed or by being reversibly closed, as shown with the ballast tube 12 capped with the end cap 15 in FIG. 1A-C or as shown with the unitary, hollow tube 52 closed with the intermediary plug 54 and the end plug 56 in FIG. 3. The container can alternatively contain the ballast insert 11 in an open, unsealed manner, wherein surrounding fluid is permitted to enter. The ballast insert 11 may comprise any material capable of providing a suitable average density to the ballast 10. Suitable materials include concrete, metal, sand, etc. In various versions of the invention, the ballast insert 11 may comprise a material having an average density of greater than about 1 g/cm$^3$, greater than about 2 g/cm$^3$, greater than about 3 g/cm$^3$, greater than about 4 g/cm$^3$, greater than about 5 g/cm$^3$, greater than about 6 g/cm$^3$, greater than about 7 g/cm$^3$, greater than about 8 g/cm$^3$, greater than about 9 g/cm$^3$, greater than about 10 g/cm$^3$, between about 1 g/cm$^3$ and about 10 g/cm$^3$, between about 3 g/cm$^3$ and about 10 g/cm$^3$, or between about 5 g/cm$^3$ and about 10 g/cm$^3$.

In some versions of the invention, the ballast 10 is anchored to a fixed location within a tank holding the liquid, such as a septic tank 60 holding septic wastewater.

Figure 4:
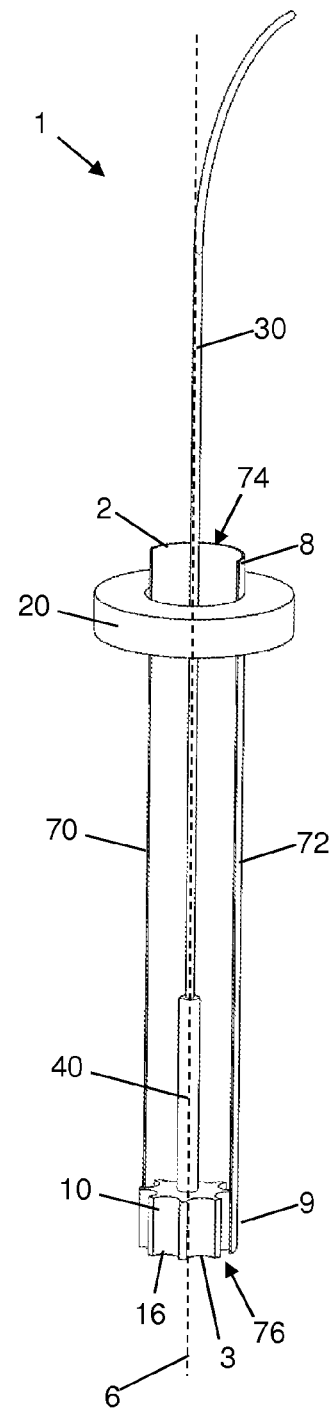
FIG. 4 depicts a partial-cutaway, elevation view of another exemplary aeration device of the present invention.

In addition to a diffuser 40, a float 20, and a ballast 10, certain aspects of the invention may further include a diffuser control tube 70 disposed about the diffuser. The diffuser control tube 70 confines the flow path of the air bubbles emitted from the diffuser 40 within its inner volume. This helps to reduce turbulence in liquid surrounding the aeration device 1. An exemplary version of a diffuser control tube 70 is shown in FIG. 4. The diffuser control tube 70 in the exemplary version comprises a hollow tube 72 with a first open end 74 and a second open end 76. The second open end 76 serves as a liquid inlet, and the first open end 74 serves as a liquid outlet. In other versions, the diffuser control tube 70 has a first open end 74 and a closed second end but has inlet ports disposed about the periphery of the hollow tube 72. In yet other versions, the diffuser control tube 70 has closed first and second ends and contains inlet and outlet ports about the periphery of the hollow tube 72. The inlet and/or outlet ports may be positioned on a portion of the hollow tube 72 such that they would remain exposed above a sediment layer should the diffuser control tube be positioned on a support surface, such as a floor 67 of a septic tank. The diffuser control tube 70 can be constructed out of a variety of materials and can be collapsible, telescoping, or rigid. The cross-sectional geometry can be round, square, or any other geometric shape.

As shown in FIG. 4, the exemplary diffuser control tube 70 extends beyond both ends of the diffuser 40. The diffuser control tube 70 may also extend the entire length of the aeration device 1 as a whole, or any portion thereof. In some versions, the diffuser control tube 70 does not extend entirely to the bottom end 3 of an aeration device 1 configured to contact a support surface, such as that shown in FIG. 2A. Such an aeration device 1 may have at least the bottom end 3 as well as further portions of the lower portion 9 extending from the second open end 76 of the diffuser control tube 70 to ensure that liquid flowing into the second open end 76 of the diffuser control tube 70 does not disrupt the sediment layer 66 resting on the support surface. The bottom end 3 of the aeration device 1 may extend at least about 2 inches, about 4 inches, about 6 inches, about 8 inches, about 10 inches, or about 12 inches or more below the second open end 76 of the diffuser control tube 70. In other versions, the diffuser control tube 70 extends entirely to the bottom end 3 of an aeration device 1 configured to contact a support surface, such as that shown in FIG. 2A. To prevent disruption of the sediment layer 66 in such a version, the diffuser control tube may have a closed second end and may comprise inlet ports disposed at a position that clears the sediment layer 66 resting on the support surface. The inlet ports may be disposed at least about 2 inches, about 4 inches, about 6 inches, about 8 inches, about 10 inches, or about 12 inches or more above the bottom end 3 or closed second end of the diffuser control tube 70.

The above elements can be interconnected by any of a number of configurations. In some versions, the ballast 10, the float 20, and the diffuser 40 together comprise a series of hollow tubes conjoined end-to-end. See, e.g., FIGS. 1A-C, described in further detail below. In other versions, the ballast 10, the float 20, and the diffuser 40 are comprised of a single, unitary hollow tube 52 partitioned with plugs 54,56 or other types of stops. See, e.g., FIG. 3, described in further detail below. In yet other versions, the various elements comprise a series of concentrically disposed elements conjoined by their inner and outer surfaces. See, e.g., FIG. 4, described in further detail below. The elements comprising the aeration device 1 can be either removable and modular or permanently fixed thereto. Removable, modular elements provide the convenience of inter-changing elements, such as floats 20 or ballasts 10 to make fine-tuned adjustments to buoyancy.

The aeration device 1 in certain versions comprises an extended longitudinal axis 6. Because the various elements exhibit a degree of flexibility, the longitudinal axis 6 may be a curvilinear longitudinal axis. The float 20 may be positioned about a first position on the longitudinal axis 6, such as a position at an upper portion 8 of the aeration device 1, and the ballast 10 may be positioned about a second position on the longitudinal axis 6, such as a position at a lower portion 9 of the aeration device 1. Such a configuration permits a float 20 and ballast 10 to orient the aeration device 1 in an upright position when disposed in a liquid. The term "upright" used herein in reference to an orientation of the aeration device 1 refers to an orientation wherein the longitudinal axis 6 of the aeration device 1 is substantially aligned with a gravitational vector 5 with the top end 2 of the aeration device 1 in an upward position (pointed opposite the gravitational vector 5) and the bottom end 3 of the aeration device 1 in a downward position (pointed toward the gravitational vector 5), as shown in FIGS. 2A-B and 5A-B.

In addition to aligning the aeration device 1 in a particular orientation within a liquid, the float 20 and the ballast 10 also contribute to positioning the aeration device 1 at a particular depth within the liquid by providing the buoyancy and gravitational forces, respectively. In some versions of the invention, the aeration device 1 is configured to float within the liquid. See, e.g., FIGS. 2B and 5A-B. As used herein, "float" refers to the suspension of an object within a liquid without the aid of solid contacts countering the gravitational pull on the object. Such versions can be achieved by providing a float 20 and ballast 10 with appropriate densities to endow the aeration device 1 as a whole with an average density approximately equal to the density of the liquid in which it is intended to float. The floatation in these versions positions the diffuser above any sediment layer 66 on a septic tank floor 67 to minimize disturbance of the sediment layer 66.

In versions of the aeration device 1 configured to float, the aeration device 1 may have a buoyancy to position the top end 2 of the aeration device 1 just below, at, or above the liquid surface 68 when floating therein. See, e.g., FIGS. 2B and 5A-B. The aeration device 1 may be configured to position the top end 2 about 0.25 inches, about 0.5 inches, about 0.75 inches, about 1 inch, about 2.5 inches, about 5 inches, or more above or below the liquid surface 68.

In versions of the aeration device 1 configured to float and further comprising a diffuser control tube 70, the aeration device 1 may have a buoyancy to position the first open end 74 at the top end 2 of the diffuser control tube 70 just below, at, or above the liquid surface 68 when floating therein. See, e.g., FIGS. 5A-B, wherein the first open end 74 of the diffuser control tube 70 is disposed above the liquid surface 68. The aeration device 1 may be configured to position the first open end 74 about 0.25 inches, about 0.5 inches, about 0.75 inches, about 1 inch, about 2.5 inches, about 5 inches, or more above or below the liquid surface 68. In these configurations, liquid is drawn through the second open end 76 of the diffuser control tube 70 and past the diffuser 40, thereby allowing transfer of oxygen to the liquid to occur. The air flow pushes the liquid out the first open end 74 of the diffuser control tube 70, and residual air escapes therefrom. Aerated liquid flows back onto or below the liquid surface, thereby generating a downward direction of water flow that, for example, may reinforce the sediment settling process.

In other versions of the invention, the aeration device 1 is configured to be submerged within the liquid and to be supported by virtue of solid contact with a solid support layer, such as a septic tank floor 67. See, e.g., FIG. 2A. Such versions can be achieved by providing a float 20 and ballast 10 with appropriate densities to endow the aeration device 1 as a whole with an average density greater than the density of the liquid residing above the solid support layer. Because the aeration device 1 remains in an upright position, the diffuser 40 is held above the tank floor 67 by a length spanning from the bottom end 3 of the aeration device 1 to the diffuser 40. To minimize disturbance of the sediment layer 66 on the septic tank floor 67, this distance may span at least the depth of the sediment layer 66. Suitable lengths spanning from the bottom end 3 of the aeration device 1 to the diffuser 40 include but are not limited to about 2 inches, about 4 inches, about 6 inches, about 8 inches, about 10 inches, about 12 inches, about 14 inches or more.

In versions of the invention configured to sink and contact a solid support layer, the aeration device 1 may have multiple contact points with the solid support layer. However, due to the operation of the float 20, only one contact point is required to support the aeration device 1 in a substantially upright orientation.

Some conventional aeration devices are specifically designed to be "self-standing," i.e., remain in a substantially upright position by virtue of a wide base that contacts a support surface and balances the device on the surface. See, e.g., U.S. Pat. No. 7,708,259. This has at least two disadvantages. First, when the device is disposed in its intended operating position (i.e., upright), the liquid above the support surface must be at a specific level for the device to be capable of aerating the liquid. If the liquid does not reach that level, it cannot be aerated. Second, if the device is incidentally knocked over, there is no automatic mechanism for uprighting the device, and aeration of the liquid will disrupt any sediment layer. Therefore, the aeration device 1 in certain versions of the invention is configured not to be "self-standing." In other words, the aeration device 1 may be configured to be unstable when supported on a solid support layer in an upright position in a medium of air. In such a configuration, at least some degree of flotation, such as when the aeration device 1 is disposed in a liquid medium, is required for the aeration device 1 to remain in an upright position. To obtain such a configuration, an end of the aeration device 1 intersected by the longitudinal axis 6 at a position proximal to the ballast 10 and distal to the float 20 (e.g., the bottom end 3) is comprised of a non-balancing surface 7, wherein "non-balancing" means that the surface 7 is incapable of providing a balance point for the aeration device 1 in a medium of air. Alternatively or additionally, the end of the aeration device 1 intersected by the longitudinal axis 6 at a position proximal to the ballast 10 and distal to the float 20 (e.g., the bottom end 3) comprises a cross-sectional width no greater than about 4×, about 3×, about 2×, about 1.5×, about 1.25×, about 1×, about 0.9×, about 0.8×, about 0.7× the cross-sectional width of any of the ballast 10, the diffuser 40, and/or the float 20. This renders the aeration device 1 "top heavy" and unstable in a medium of air. Alternatively or additionally, the end of the aeration device 1 intersected by the longitudinal axis 6 at a position proximal to the ballast 10 and distal to the float 20 (e.g., the bottom end 3) comprises a point contact, as opposed to a line or plane contact surface. Because a wide support base is not required to maintain an upright orientation of the aeration device 1 of the present invention, the aeration device 1 can be made slender so it can be introduced into a septic tank 60 through a relatively small diameter opening in the tank 60. Suitable cross-sectional widths may include but are not limited to dimensions of about 3.5 inches in diameter. In addition, the instability in an air medium ensures positioning of the diffuser 40 within any level of liquid due to a tilting action of the aeration device 1. This enables aeration of liquid even when a tank, such as a septic tank 60, is not entirely filled with the liquid.

The aeration device 1 may be configured either to float or to contact a support surface by configuring it to have a buoyancy at a specific depth of a given liquid, such as water. This is useful because different septic tanks 60 are configured to hold liquid at different depths above the tank floor 67. This is also useful because the aeration device 1 may be used in systems other than septic tanks, such as ponds or other liquid systems. A typical septic tank 60 may be designed to contain the liquid at a depth of about 5 feet. For an aeration device 1 to contact the floor 67 in such a tank 60 or in a tank 60 having a shallower depth, the aeration device 1 can be configured to position a bottom end 3 of the aeration device 1 in the liquid at a depth no less than about 5 feet, such as about 7.5 feet, about 10 feet, about 20 feet, about 50 feet or more. An aeration device 1 configured to float in a tank 60 with a depth of about 5 feet or more can be configured to position the bottom end 3 of the aeration device in the liquid at a depth no greater than about 5 feet, such as about 4, about 3, about 2, or about 1 feet. An aeration device 1 configured to float in larger tank 60 may be configured to position the bottom end 3 of the aeration device 1 in the liquid at a depth no greater than about 7.5 feet, about 10 feet, about 20 feet, about 50 feet, or more, depending on the tank size. In general, to configure an aeration device to contact a support surface underlying a liquid, the buoyancy of the aeration device 1 can be adjusted to position the bottom end 3 of the aeration device in the liquid at a depth greater than the depth of the support surface. To configure an aeration device to float above a support surface underlying a liquid, the buoyancy of the aeration device 1 can be adjusted to position the bottom end 3 of the aeration device in the liquid at a depth less than the depth of the support surface. The average density and occupied volume of the aeration device 1 determines its buoyancy, and the average density of the aeration device 1 is a function of the average density and occupied volume of both the float 20 and the ballast 10. Therefore, configuring the aeration device in the manner described above can be performed by adjusting the average densities and occupied volumes of the float 20 and ballast 10.

An exemplary aeration device 1 of the present invention is shown in FIGS. 1A-C. The aeration device 1 comprises a float 20 at an upper portion 8 of the aeration device 1, a ballast 10 at a lower portion 9 of the aeration device 1, a diffuser 40 between the float 20 and the ballast 10, and an air line 30 configured to feed air to the diffuser 40. The float 20, the diffuser 40, and the ballast 10 are disposed about the longitudinal axis 6 at different positions thereof. The float 20 comprises a hollow float tube 22 capped on either end with removable upper and lower end caps 26,28. The end caps 26,28 are configured to provide a substantially fluid-tight seal to prevent air contained within the float tube 22 from leaking into surrounding liquid and to prevent the surrounding liquid from leaking into the float tube 22. The diffuser 40 comprises a hollow, perforated diffuser tube 41 with opposing ends nested within upper and lower diffuser adapter tubes 42,44. The diffuser adapter tubes 42,44 are each capped with removable end caps 43,45. The diffuser 40 and end caps 43,45 nest within the adapter tubes 42,44 to provide a fluid-tight seal. The air tube 30 comprises hollow tubing capable of transferring air into the diffuser 40, and is coupled to the diffuser adapter tube 44 via an elbow-shaped adapter connector 32. The ballast 10 comprises a hollow ballast tube 12 with a ballast insert 11 disposed therein. The ballast insert 11 is maintained within the ballast tube 12 by virtue of an end cap 13. The float 20, ballast 40, and the diffuser 40 are connected by a variety of coupling devices. A coupling ring 24 connects the float 20 to the diffuser 40 by coupling the float tube 22 to the upper diffuser adapter tube 42. A flared portion 14 of the ballast tube 12 connects the ballast 10 to the diffuser 40 by coupling to the lower adapter tube 44. These couplings may provide fluid-tight seals. A bottom end 3 of the aeration device 1 is a non-balancing surface 7.

In a variation of the version shown in FIGS. 1A-C, the ends of any of the ballast tube 12, the float tube 22, and/or the diffuser tube may be permanently closed instead of being reversibly closed with the removable end caps 26,28,43,45,13 shown in FIGS. 1A-C. In addition, any connection mechanism may be employed to conjoin the ballast 10, diffuser 40, and float 20 to each other. The diffuser 40, for example, may be devoid of adapter tubes 42,44 and may be directly conjoined to the ballast 10 and/or float 20. Finally, the ballast 10, diffuser 40, and float 20 may be conjoined in any order. Disposing the ballast 10 and float 20 on opposing, extreme ends of the aeration device, however, provides for a stable orientation. Other variations consistent with the description provided herein are acceptable.

Another exemplary aeration device 1 of the present invention is shown in FIG. 3. In this version, the float 20, diffuser 40, and ballast 10 are all comprised within a single, unitary hollow tube 52. The float 20 and diffuser 40 are coextensive within the upper portion 8 of the tube 52 at a portion extending to a fluid-tight intermediary plug 54. The float 20 and diffuser 40 can be connected to an air line (not shown) by a barbed adapter connector 34. Floatation with the float 20 is provided by flux of air through the upper portion 8 of the hollow tube 52, which displaces any liquid within the hollow tube 52 or prevents liquid from entering the hollow tube 52 in the first place. Air diffusion with the diffuser 40 is provided by perforations (not shown) in at least a portion of the upper portion 8 of the hollow tube 52. The plug 54 can comprise any device that can be inserted within the hollow tube 52 and impede air flow therethrough. In the version shown in FIG. 3, the plug 54 is a ball. Alternatives to the plug 54 include but are not limited to bands, clips, binders, creases, folds, knots or other devices or configurations that pinch the hollow tube 52 from the outside to impede air flow therethrough. The ballast 10 includes a ballast insert 11 inserted in the hollow tube 52 and maintained in a lower portion 9 thereof by virtue of the intermediate plug 54 and a terminal plug 56. The float 20, the diffuser 40, and the ballast 10 are disposed about the longitudinal axis 6 at different positions thereof. A bottom end 3 of the aeration device 1 is a non-balancing surface 7.

Another exemplary aeration device 1 of the present invention is shown in FIG. 4. A float 20, diffuser control tube 70, and ballast 10 are disposed about a longitudinal axis 6, with the float 20 disposed at an upper portion 8 and the ballast disposed at a lower portion 9. The diffuser control tube 70 is also disposed about a diffuser 40, which is situated on the longitudinal axis 6. An air tube 30 extends through the diffuser control tube 70 to connect to the diffuser 40 for feeding air thereto. The float 20 is circumferentially attached to an outer perimeter of the diffuser control tube 70 at the upper portion 8, and the diffuser control tube 70 is circumferentially attached to an outer perimeter of the ballast 10 at the lower portion 9. The ballast 10, the diffuser 40, and the air line 30 are connected in an end-to-end manner. The ballast comprises gaps 16 that permit liquid to enter the diffuser control tube 70 at the bottom end 3, flow past the diffuser 40, and exit the diffuser control tube 70 at the top end 2.

Figure 2A:
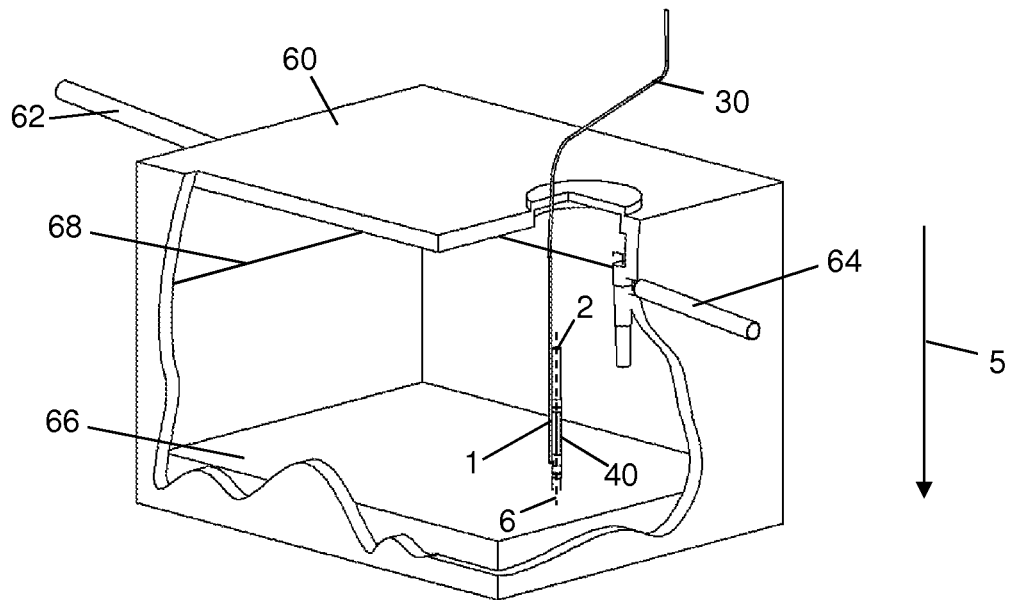
FIG. 2A depicts a septic tank comprising the aeration device shown in FIGS. 1A-C configured to be supported on the floor of the septic tank.
Figure 2B:
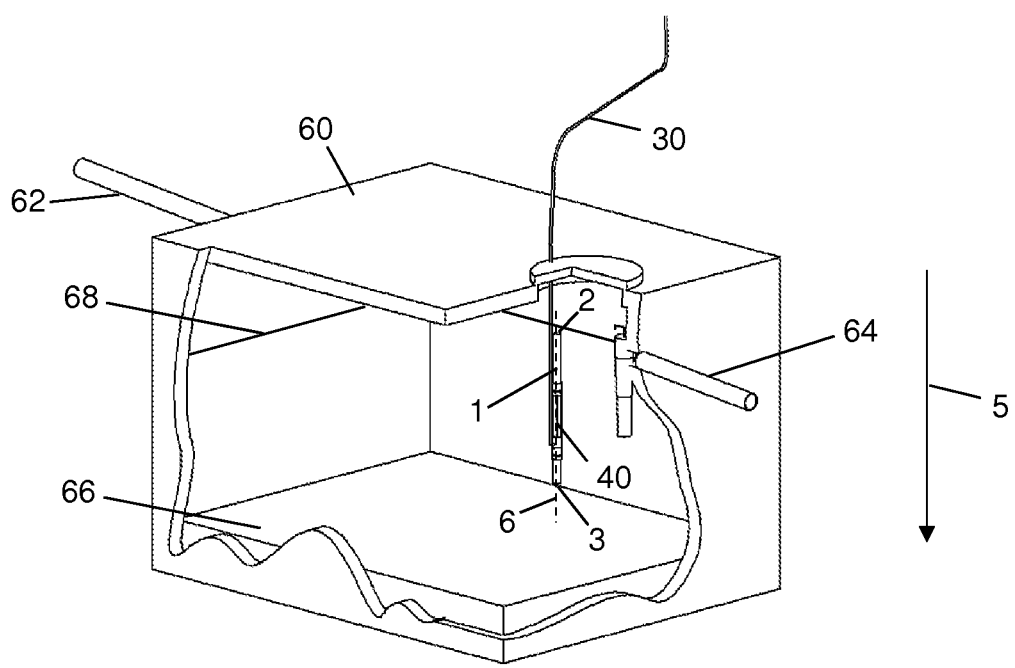
FIG. 2B depicts a septic tank comprising the aeration device shown in FIGS. 1A-C configured to float above the sediment layer on the floor of the septic tank.
Figure 5A:
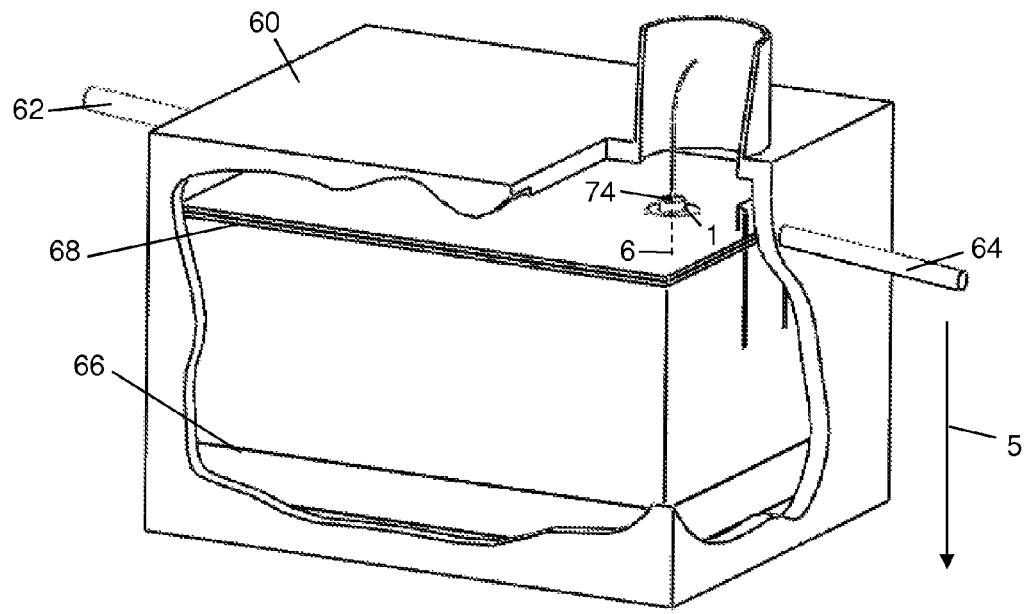
FIG. 5A depicts a septic tank comprising the aeration device shown in FIG. 4 configured to float above the sediment layer on the floor of the septic tank.
Figure 5B:
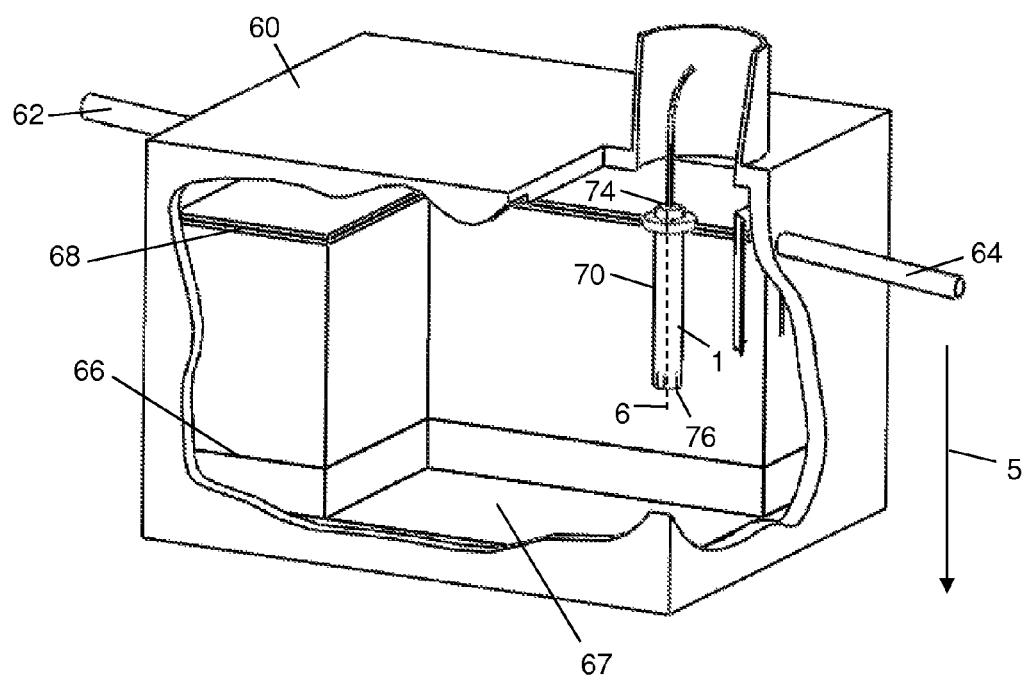
FIG. 5B depicts the septic tank shown in FIG. 5A with the water partially cut away to expose the position of the aeration device within the tank.

Positioning of the aforementioned exemplary aeration devices 1 in septic tanks 60 is shown in FIGS. 2A-B and 5A-B. The depicted septic tanks 60 include an inlet pipe 62, an outlet pipe 64, a tank floor 68, a sediment layer 66 on the tank floor 67, and a water layer above the sediment layer 66 indicated by a water surface 68. In each septic tank 60, a aeration device 1 is disposed in water with the longitudinal axis 6 substantially aligned with a gravitational vector 5. In FIG. 2A, an aeration device 1 configured to contact the tank floor 67 is shown resting on the tank floor (tank floor not shown) with the diffuser 40 disposed above the sediment layer 66 by virtue of a distance defining a length of the lower portion 9 of the aeration device 1 extending to the diffuser 40. In FIG. 2B, an aeration device 1 configured to float above the tank floor 67 is shown floating near the water surface 68 with the diffuser 40 disposed above the sediment layer 66 by virtue of the floatation. In FIGS. 5A and B, an aeration device 1 comprising a diffuser control tube 70 and configured to float above the tank floor 67 is shown floating near the water surface 68 with first open end 74 of the diffuser control tube 70 disposed above the water surface 68 and the second open end 76 of the diffuser control tube 70 disposed above the sediment layer 66. Positioning the aeration device 1 at the positions shown in FIGS. 2A-B and 5A-B or at any position therebetween can be obtained by adjusting the density of the ballast with respect to that float, thereby modulating the buoyancy of the aeration device 1.

Various methods of aerating liquid in a tank, such as aerating wastewater in a septic tank, with the aeration devices 1 described herein are apparent from the above description. An exemplary method includes aerating liquid in a liquid-filled tank with an aeration device 1 as described herein by inserting the aeration device in the liquid and feeding air through the diffuser and into the liquid. The inserting the aeration device in the liquid may comprise submerging the aeration device within the liquid, supporting the aeration device on a support surface in the tank, and maintaining substantial alignment of the longitudinal axis of the aeration device with the gravitational vector. Alternatively, the inserting the aeration device in the liquid may comprise floating the aeration device within the liquid and maintaining substantial alignment of the longitudinal axis of the aeration device with the gravitational vector.

As used herein, "tank" refers to any container of a liquid, including septic tanks, sewage tanks, ponds, rivers, etc. "Support surface" refers to any solid support within the tank.

The elements and method steps described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the following claims.

What is claimed is:

1. An aeration device defining a longitudinal axis comprising:
   a float positioned about a first position on the longitudinal axis and having an average density;
   a ballast connected to the float, positioned about a second position on the longitudinal axis, and having an average density greater than the average density of the float;
   a diffuser connected to the ballast, and
   a point contact disposed at an end of the longitudinal axis proximal to the ballast and distal to the float,
   wherein the float and the ballast are configured to orient the aeration device in a liquid with the longitudinal axis substantially aligned with a gravitational vector, and
   wherein the diffuser is interfaced with an external air source.

2. The aeration device of claim 1 wherein the average density of the float is less than a density of water.

3. The aeration device of claim 1 wherein the average density of the float is less than average density of the aeration device as a whole.

4. The aeration device of claim 1 wherein the float comprises contained air.

5. The aeration device of claim 1 wherein the float comprises fluxed air.

6. The aeration device of claim 1 wherein the float and the diffuser comprise an overlapping portion of a single tube.

7. The aeration device of claim 6 wherein the single tube at the overlapping portion is composed of a material having a density less than water.

8. The aeration device of claim 1 wherein the average density of the ballast is greater than a density of water.

9. The aeration device of claim 1 wherein the average density of the ballast is greater than average density of the aeration device as a whole.

10. The aeration device of claim 1 wherein the ballast comprises an enclosed tube containing a ballast insert.

11. The aeration device of claim 1 wherein the ballast, the float, and the diffuser together comprise a series of hollow tubes conjoined end-to-end.

12. The aeration device of claim 1 wherein the ballast, the float, and the diffuser are comprised of a single hollow tube.

13. The aeration device of claim 1 further comprising a diffuser control tube disposed about the diffuser wherein a sidewall of the diffuser control tube is substantially continuous.

14. The aeration device of claim 13 wherein the diffuser control tube comprises an open first end and the aeration device has a buoyancy to position the open first end at or above a surface of water when floating therein.

15. The aeration device of claim 1 wherein the aeration device has a buoyancy to position a bottom end of the aeration device in water at a depth of no greater than 5 feet.

16. The aeration device of claim 1 wherein the aeration device has a buoyancy to position a bottom end of the aeration device in water at a depth of no less than 5 feet.

17. A method of aerating liquid in a liquid-filled tank with an aeration device as recited in claim 1 comprising inserting the aeration device in the liquid and feeding air through the diffuser and into the liquid.

18. The method of claim 17 wherein the inserting the aeration device in the liquid comprises submerging the aeration device within the liquid, supporting the aeration device on a floor of the tank, and maintaining substantial alignment of the longitudinal axis of the aeration device with the gravitational vector.

19. The method of claim 17 wherein the inserting the aeration device in the liquid comprises floating the aeration device within the liquid and maintaining substantial alignment of the longitudinal axis of the aeration device with the gravitational vector.

20. The device of claim 1 wherein the external air source is a positive displacement air pump.

* * * * *